United States Patent
Yan et al.

(10) Patent No.: US 10,403,056 B2
(45) Date of Patent: Sep. 3, 2019

(54) AGING PROFILING ENGINE FOR PHYSICAL SYSTEMS

(71) Applicant: NEC Laboratories America, Inc., Princeton, NJ (US)

(72) Inventors: Tan Yan, Bedminster, NJ (US); Guofei Jiang, Princeton, NJ (US); Haifeng Chen, Old Bridge, NJ (US); Kai Zhang, Monmouth Junction, NJ (US)

(73) Assignee: NEC Corporation (JP)

( * ) Notice: Subject to any disclaimer, the term of this patent is extended or adjusted under 35 U.S.C. 154(b) by 696 days.

(21) Appl. No.: 14/961,519

(22) Filed: Dec. 7, 2015

(65) Prior Publication Data

US 2016/0161374 A1 Jun. 9, 2016

Related U.S. Application Data

(60) Provisional application No. 62/088,840, filed on Dec. 8, 2014.

(51) Int. Cl.
*G01M 99/00* (2011.01)
*G07C 3/00* (2006.01)
*G05B 23/02* (2006.01)

(52) U.S. Cl.
CPC ........... *G07C 3/00* (2013.01); *G05B 23/0232* (2013.01); *G05B 23/0283* (2013.01)

(58) Field of Classification Search
None
See application file for complete search history.

(56) References Cited

U.S. PATENT DOCUMENTS 5,983,162 A * 11/1999 Huang .................... G06F 17/14
702/15
6,311,130 B1 * 10/2001 Huang .................... G06F 17/14
702/15

(Continued)

FOREIGN PATENT DOCUMENTS

WO    WO-2013113111 A1 *  8/2013    .......... G06K 9/00523

OTHER PUBLICATIONS

Dong et al, "Bearing degradation process prediction based on the PCA and optimized LS-SVM model," School of Mechatronics and Automotive Engineering, Chongqing Jiaotong University, Chongqing 400074 (Year: 2013).*

(Continued)

*Primary Examiner* — Janet L Suglo
*Assistant Examiner* — Leonard S Liang
(74) *Attorney, Agent, or Firm* — Joseph Kolodka

(57) ABSTRACT

Systems and methods for managing components of physical systems, including decomposing raw time series by extracting an aging trend and a fluctuation term from the time series using an objective function of an optimization problem, the objective function minimizing reconstruction error and ensuring flatness of the fluctuation term over time. The optimization problem is transformed into a Quadratic Programming (QP) formulation including a monotonicity constraint and a non-negativity constraint, the constraints being merged together to reduce computational costs. An aging score and a confidence score are generated for the extracted aging trend to determine a severeness of aging for one or more components of the physical system, and the aging score and confidence score are fused to provide a fused ranking for the extracted aging trend for predicting future failures of the components.

16 Claims, 6 Drawing Sheets

(56) References Cited

U.S. PATENT DOCUMENTS

| | | | | |
|---|---|---|---|---|
| 6,903,564 | B1* | 6/2005 | Suzuki | G01R 31/2884 324/762.02 |
| 7,065,465 | B2 | 6/2006 | Chen | G06K 9/3241 324/614 |
| 7,409,320 | B2* | 8/2008 | Wegerich | G06K 9/00536 702/189 |
| 7,747,401 | B2* | 6/2010 | Lu | G06K 9/00523 702/66 |
| 7,966,156 | B1* | 6/2011 | Frei | G06F 17/14 702/190 |
| 8,103,463 | B2* | 1/2012 | Kalgren | G01D 3/08 702/117 |
| 8,560,161 | B1* | 10/2013 | Kator | G06Q 10/087 701/29.6 |
| 9,652,714 | B2* | 5/2017 | Achin | G06N 5/04 |
| 9,772,741 | B2* | 9/2017 | Aliferis | G06F 3/0481 |
| 9,841,184 | B2* | 12/2017 | Kreider | F22B 35/18 |
| 2004/0030524 | A1* | 2/2004 | Jarrell | G05B 23/0221 702/113 |
| 2004/0078160 | A1* | 4/2004 | Frei | G06F 17/14 702/79 |
| 2008/0172356 | A1* | 7/2008 | Bruno | G06F 17/30442 |
| 2008/0208487 | A1* | 8/2008 | Goebel | G06Q 10/04 702/34 |
| 2011/0054806 | A1* | 3/2011 | Goldfine | G07C 3/00 702/34 |
| 2011/0101990 | A1* | 5/2011 | Noorlag | G11C 5/02 324/537 |
| 2011/0137575 | A1* | 6/2011 | Koul | G05B 23/0245 702/34 |
| 2011/0173432 | A1* | 7/2011 | Cher | G01R 31/31725 713/100 |
| 2017/0160734 | A1* | 6/2017 | Masse | G05B 23/0235 |
| 2017/0286854 | A1* | 10/2017 | Ardis | G06N 5/02 |
| 2017/0329881 | A1* | 11/2017 | Korada | G06Q 30/016 |
| 2017/0352105 | A1* | 12/2017 | Billings | G06Q 40/08 |

OTHER PUBLICATIONS

Alexandrov, et al., "Research Report Series", A Review of Some Modern Approaches to the Problem of Trend Extraction, Statistics, Center of Industrial Mathematics, University of Bremen Department of Statistics, University of Bologna Statistical, Mar. 2008, pp. 1-32.

Zhang, et al., "Improved Nyström Low-Rank Approximation and Error Analysis", Proceedings of the 25th International Conference on Machine Learning, Jul. 2008, 8 Pages.

Zhang, et al., "Scaling up Kernel SVM on Limited Resources: A Low-rank Linearization Approach", Proceedings of the 15th International Conference on Artificial Intelligence and Statistics (AISTATS), Apr. 2012, pp. 1425-1434.

Comon, "Independent Component Analysis, A New Concept? Signal Processing", Apr. 1994, pp. 287-314.

Djurdjanovic, et al., "Watchdog Agentan Infotronics-based Prognostics Approach for Product Performance Degradation Assessment and Prediction", Advanced Engineering Informatics, Jul. 2003, pp. 109-125.

Goldfarb et al., "A NumericallySAtable Dual Method for Solving Strictly Convex Quadratic Programs", Mathematical Programming, 1983, pp. 1-33.

Delmas, et al., "Detection of Cellular Aging in a Galton-watson Process", Stochastic Processes and their Applications, 2010, pp. 2495-2519.

* cited by examiner

AGING PROFILING ENGINE FOR PHYSICAL SYSTEMS

RELATED APPLICATION INFORMATION

This application claims priority to provisional application Ser. No. 62/088,840 filed on Dec. 8, 2014, incorporated herein by reference in its entirety.

BACKGROUND

Technical Field

The present invention relates to the management of physical systems, and, more particularly, to the management of components of physical systems using a time series aging profiling engine.

Description of the Related Art

Long term operation of physical systems causes degradation of their components, which may cause, for example, overall system performance degradation, component malfunctions, or even failure of the whole system. Degradations (e.g., aging) may lead to condition changes in mean values, amplitudes, and/or frequencies in the sensed signals of the system, and is an unavoidable property of any system. However, well-timed detection and profiling of aging trends may help to avoid consequences and problems degradation/aging may cause, and is a crucial task when using modern machinery because if one component of a system fails, it may lead to the stoppage of the whole system. Furthermore even short interruptions in production processes (e.g., because of component degradation/failure) may result in, for example, huge money losses and serious business related issues.

Problems with conventional trend analysis and extraction for time series have attracted significant attention recently, as aging trends are important for avoiding component failures in physical systems. However, conventional systems and methods are only able to focus on extracting general trend behavior from time series, and none of them can specifically addresses aging detection and profiling without having prior knowledge of time series properties (e.g., seasonality, level of noise, etc.).

Aging trend extraction may be employed to detect and analyze aging phenomena and/or degrading behavior in time series obtained from sensors monitoring physical systems (e.g., machinery). However, such problems are complicated and computation intensive because systems are generally operated according to some specific patterns. Moreover, the aging behavior is generally invisible (e.g., undetectable by humans) due to, for example, high noise and operational signals, and thus is generally too small to be detected using conventional systems and methods.

SUMMARY

A method for managing components of physical systems, including decomposing raw time series by extracting an aging trend and a fluctuation term from the time series using an objective function of an optimization problem, the objective function minimizing reconstruction error and ensuring flatness of the fluctuation term over time. The optimization problem is transformed into a Quadratic Programming (QP) formulation including a monotonicity constraint and a non-negativity constraint, the constraints being merged together to reduce computational costs. An aging score and a confidence score are generated for the extracted aging trend to determine a severeness of aging for one or more components of the physical system, and the aging score and confidence score are fused to provide a fused ranking for the extracted aging trend for predicting future failures of the components.

An aging profiling engine for managing components of physical systems, including a time series transformer for decomposing raw time series by extracting an aging trend and a fluctuation term from the time series using an objective function of an optimization problem, the objective function minimizing reconstruction error and ensuring flatness of the fluctuation term over time. An optimizer transforms the optimization problem into a Quadratic Programming (QP) formulation including a monotonicity constraint and a non-negativity constraint, and the constraints are merged together to reduce computational costs. One or more score generators for generating an aging score and a confidence score for the extracted aging trend to determine a severeness of aging for one or more components of the physical system, and a ranker is configured to fuse the aging score and confidence score to provide a fused ranking for the extracted aging trend for predicting future failures of the components.

A computer-readable storage medium including a computer-readable program, wherein the computer-readable program when executed on a computer causes the computer to perform the steps of decomposing raw time series by extracting an aging trend and a fluctuation term from the time series using an objective function of an optimization problem, the objective function minimizing reconstruction error and ensuring flatness of the fluctuation term over time. The optimization problem is transformed into a Quadratic Programming (QP) formulation including a monotonicity constraint and a non-negativity constraint, the constraints being merged together to reduce computational costs. An aging score and a confidence score are generated for the extracted aging trend to determine a severeness of aging for one or more components of the physical system, and the aging score and confidence score are fused to provide a fused ranking for the extracted aging trend for predicting future failures of the components.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
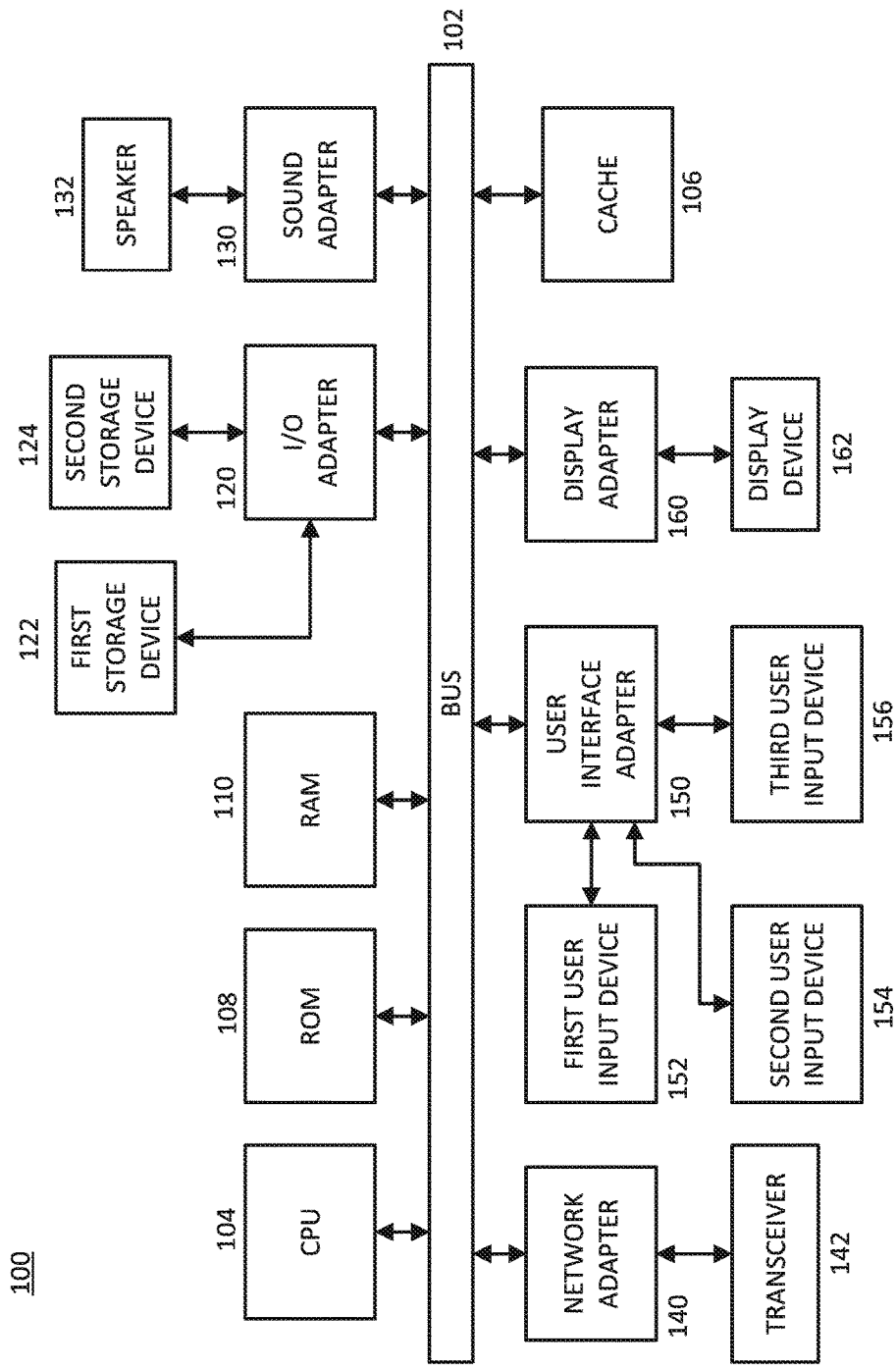
FIG. 1 shows an exemplary processing system to which the present principles may be applied, in accordance with an embodiment of the present principles.

Long-term operation of physical systems inevitably leads to aging of the components, which may cause performance degradation, component malfunction, or even failure of the whole system. To avoid unexpected breakages of the system, it may be put under constant monitoring to ensure accurate detection and profiling of possible aging signs. The present principles provide a time series analysis technique that accurately extracts the aging shape of giving time series, analyzes the aging behavior, and ranks its severeness according to various embodiments.

In a particularly useful embodiment, time series may be decomposed/transformed into aging and fluctuation components, the underlying decomposition problem may be formulated as an optimization problem, and converted to the Quadratic Programming (QP) formulation that can be solved by existing solvers. To increase the speed and reduce processing requirements during the solving process, the formulation of the problem is further optimized and converted to an Non-negative QP problem that can be solved much more efficiently using iterative updates. The aging profiling according to the present principles may be applied in synthetic and/or real-world datasets, and data can be obtained using, for example, sensors or other measurement devices to accurately profile the shape of the degradation and precisely locate the starting point of the degradation process according to various embodiments of the present principles.

In one embodiment, the present principles may employ a time series analysis technique that accurately extracts the aging phenomena of giving time series, analyzes the aging behavior, and ranks its severeness. More particularly, an aging profiling engine, which decomposes the given time series into two principal components (e.g. a monotonic aging trend and a fluctuation term) may be employed according to the present principles. A general idea behind this approach is to give a clear separation of the aging trend from the stationary fluctuation term that has no mean change over long time (e.g., has no slope in the long term). After decomposing the given time series into these two components the aging trend may be analyzed to discover its changes including the slope and the shape that indicates the starting point of the degradation according to the present principles.

In one embodiment, the aging extraction may be formulated as an optimization problem. Its objective function may include two parts: (1) Minimizing the reconstruction error as the difference between the original time series and sum of the extracted trend and the fluctuation term, and (2) Ensure flatness of the fluctuation term over time. Under such objectives, the solution may also satisfy two constraints: (1) monotonicity of an aging trend and non-negativity of the extracted two components. The formulated objective function is analyzed and this problem statement is further transformed/converted to a Quadratic Programming (QP) formulation that can be solved with existing known methods.

In one embodiment, to further speed up the problem solving, a matrix transformation technique may be employed to simplify the constraints and reduce the number of constraints (e.g., from two to one—only non-negativity constraint). We convert the problem to an Non-negative QP problem that can be solved much more efficiently using iterative updates. The present principles may be employed to iteratively solve the reformulated Non-negative QP problem and significantly reduce the solving time. Moreover, using the optimization techniques proposed in this paper, the solution of the problem is tractable, and thus, applicable to any size (e.g., small or extremely large) time series.

In one embodiment, an aging score and a confidence score may be determined/generated to analyze the extracted aging component of the time series. Essentially, the aging score shows how perceptibly aging is expressed in the time series, and the confidence score measures how close the original time series is to the reconstructed one from the extracted two components. Based on such scores, the aging profiling engine reports the result of decomposition with a ranking of the aging level and the corresponding confidence level of the extraction according to various embodiments of the present principles.

The aging profiling engine may be applied to a synthetic dataset with different properties and any real world datasets (e.g., currency exchange rates, stock prices, manufacturing plants, etc.). The present principles may be applied to accurately profile the shape of the degradation and precisely locate the starting point of the degradation process according to various embodiments. In some embodiments, the present principles may be applied to formulate an objective function for extracting trend and fluctuation terms, and building the mathematical model to transmit the aging profiling requirements into mathematical formulation for controlling the components/system. The problem may be a convex problem, which may be converted into a QP formulation, and an optimization method may be employed to solve the problem with non-negative QP formulation according to various embodiments.

For facilitating the presentation of the paper, in this section we give the following two definitions. The aging trend of a time series is a monotonic sequence that represents the change of the mean value of the time series over the time. The fluctuation term of a time series is a stationary component, i.e. the component whose mean value does not change over time. It is noted that only monotonic aging trends, whose values must be either non-decreasing or non-increasing, are presented for simplicity of illustration, and this characteristic may be enforced because practically the aging of system components is monotonic. However, it is noted that the present principles may be applied to any aging trends according to various embodiments.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
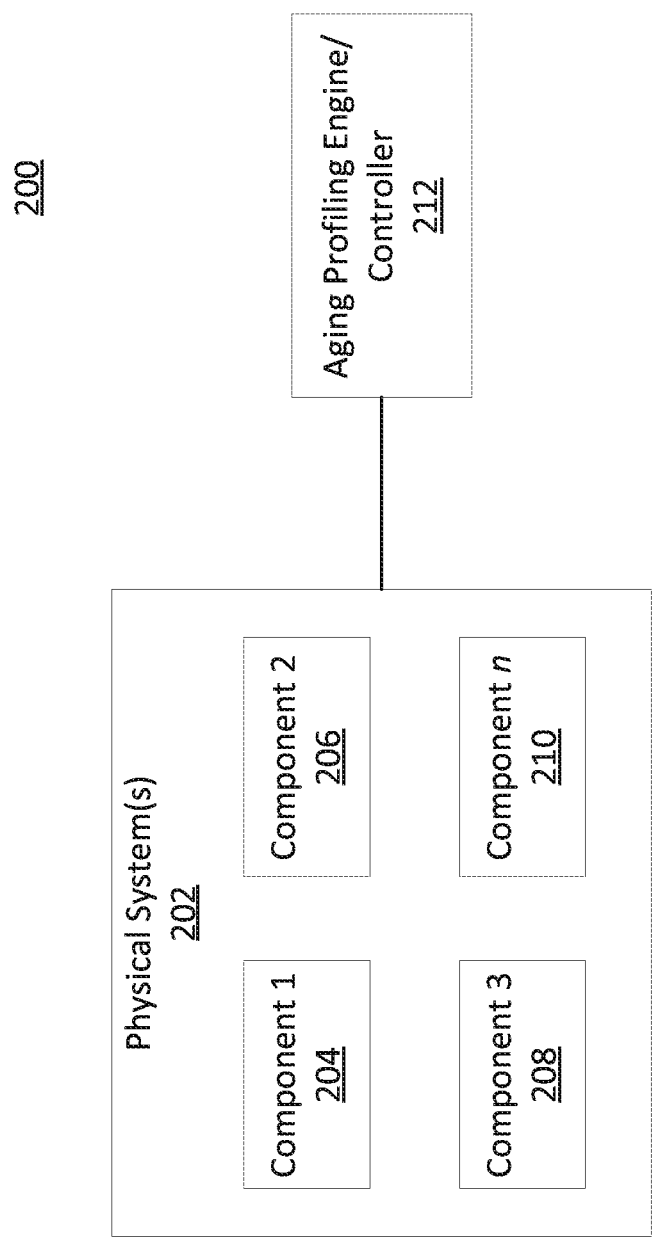
FIG. 2 shows a high level diagram of an exemplary physical system including an aging profiling engine, in accordance with an embodiment of the present principles.
Figure 6:
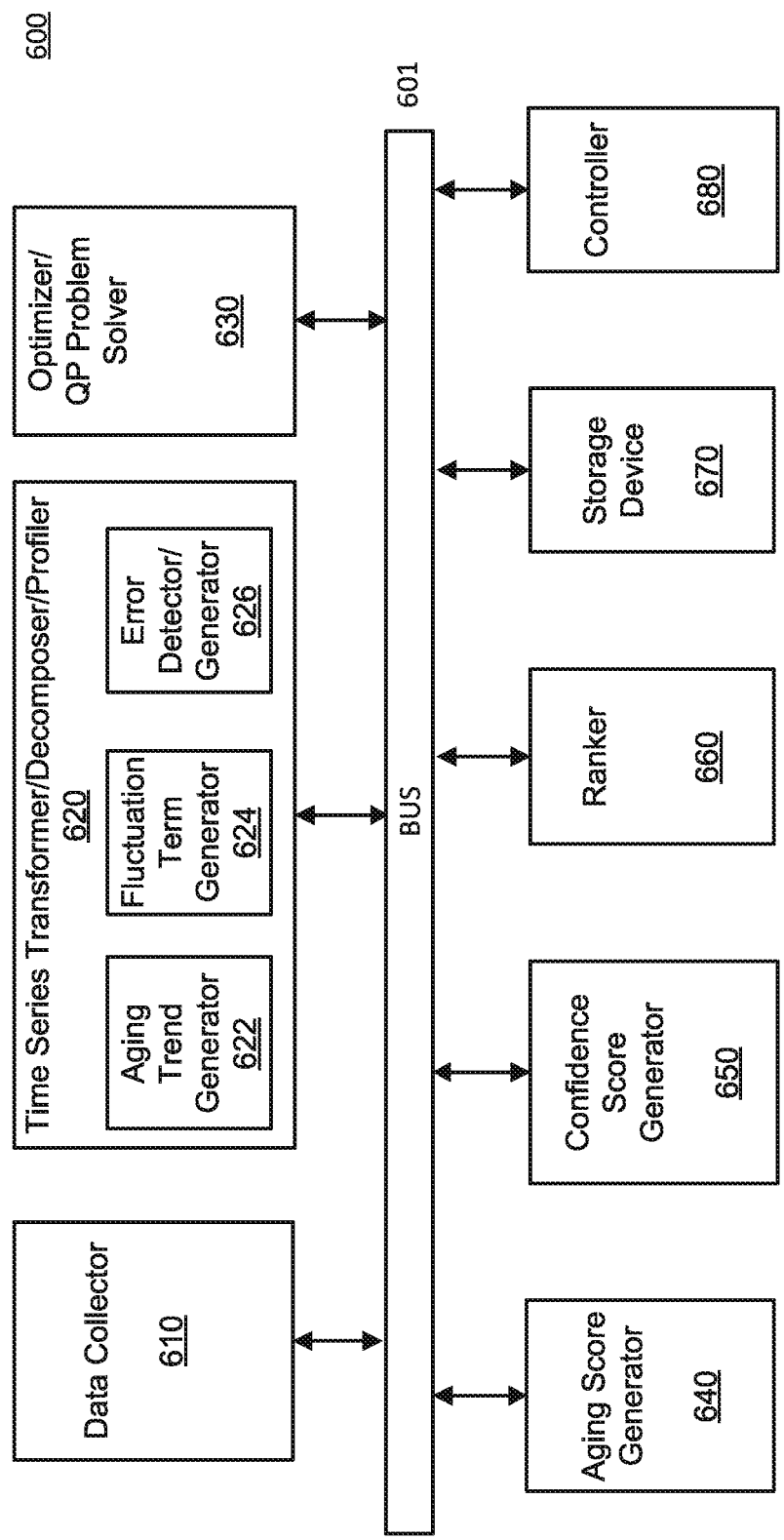
FIG. 6 shows an exemplary system for aging profiling for physical systems using an aging profiling engine, in accordance with an embodiment of the present principles.

Moreover, it is to be appreciated that circuits/systems/networks 200 and 600 described below with respect to FIGS. 2 and 6 are circuits/systems/networks for implementing respective embodiments of the present principles. Part or all of processing system 100 may be implemented in one or more of the elements of systems 200 and 600 with respect to FIGS. 2 and 6.

Figure 4:
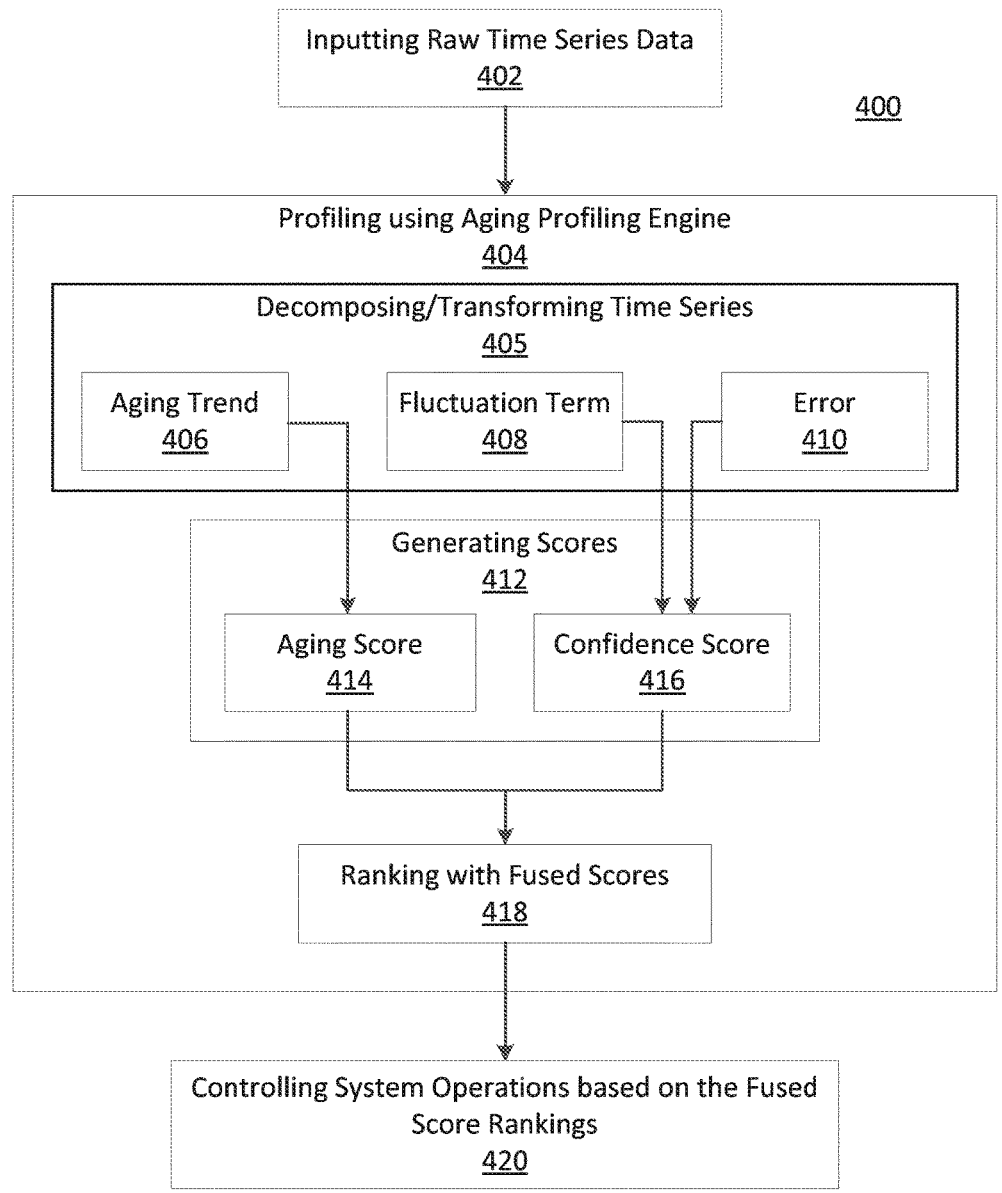
FIG. 4 shows an exemplary high-level method for aging profiling for components of systems using an aging profiling engine, in accordance with an embodiment of the present principles.

Further, it is to be appreciated that processing system 100 may perform at least part of the methods described herein including, for example, at least part of method 400 of FIG. 4. Similarly, part or all of circuits/systems/networks 200 and 600 of FIGS. 2 and 6 may be used to perform at least part of the methods described herein including, for example, at least part of method 400 of FIG. 4.

Referring now to FIG. 2, a high level schematic 200 of an exemplary physical system including an aging profiling engine 212 is illustratively depicted in accordance with an embodiment of the present principles. In one embodiment, one or more components of physical systems 202 may be controlled and/or monitored using an aging profiling engine 212 according to the present principles. The physical systems may include a plurality of components 204, 206, 208, 210 (e.g., Components 1, 2, 3, . . . n), for performing various system processes, although the components may also include data regarding, for example, financial transactions and the like according to various embodiments.

In one embodiment, components 204, 206, 208, 210 may include any components now known or known in the future for performing operations in physical (or virtual) systems (e.g., temperature sensors, deposition devices, key performance indicator (KPI), pH sensors, financial data, etc.), and data collected from various components (or received (e.g., as time series)) may be employed as input to the aging profiling engine 212 according to the present principles. The aging profiling engine/controller 212 may be directly connected to the physical system or may be employed to remotely monitor and/or control the quality and/or components of the system according to various embodiments of the present principles. The aging profiling engine 212 will be described in further detail herein below.

Figure 3:
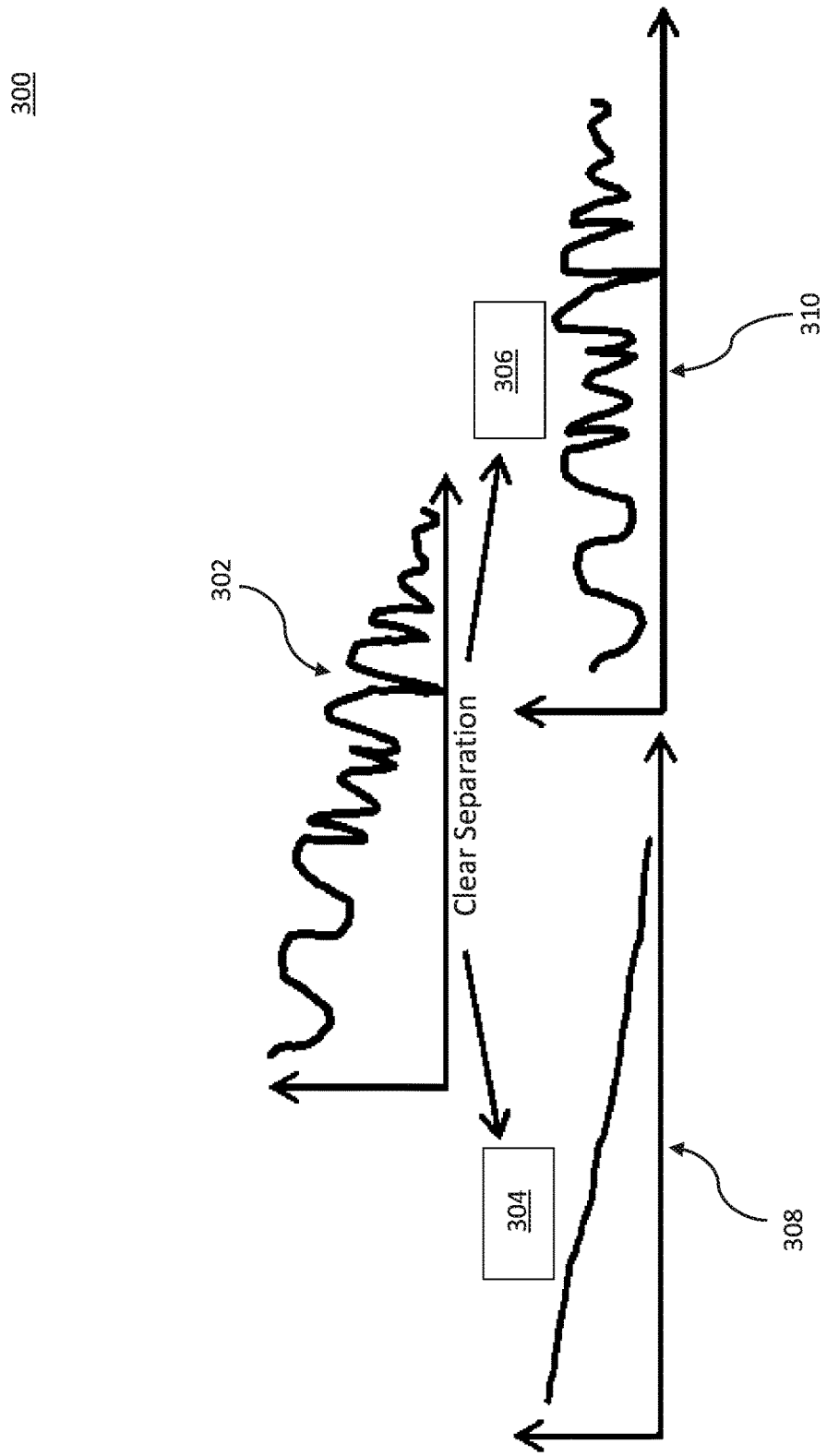
FIG. 3 shows an exemplary time series graph that is decomposed and transformed, in accordance with an embodiment of the present principles.

Referring now to FIG. 3 an exemplary time series graph 300 that is decomposed and transformed is illustratively depicted in accordance with an embodiment of the present principles. In one embodiment, a goal of the present principles is to decompose a given time series 302 (e.g., raw time series) into a monotonic aging trend 304 and a fluctuation component 306 according to the present principles.

In one embodiment, this transforms the original time series 302 into a monotonic function 308 and a non-monotonic function with zero-mean shift 310 by decomposing/separating the aging term 304 and the fluctuation term 306 from the original time series. Under such a requirement, the problem definition states as follows: given an input time series of length T, $s \in RT \times 1$, we want to decompose it into the following terms:

$$s = x_a + x_f \quad (1)$$

where $x_a$ is the aging term and $x_f$ is the fluctuating term.

In one embodiment, to extract the aging signal/term 304, an aging extraction problem may be formulated as an optimization problem. The extracted aging signal 304 may be monotonic and may have a clean separation from background signal and/or noise. Thus, the objective function may be designed to include two parts: (1) minimizing the reconstruction error as a difference between the original time series 302 and sum of the extracted aging trend 304 and the fluctuation term 306, and (2) ensure flatness of the fluctuation term 306 over time according to various embodiments. The decomposition/transformation performed by the aging profile engine will be described in further detail herein below according to various embodiments of the present principles.

Referring now to FIG. 4, an exemplary high-level method 400 for aging profiling (e.g., for components of physical systems, virtual systems, etc.) using an aging profiling engine is illustratively depicted in accordance with an embodiment of the present principles. In one embodiment, input may be received in block 402, and may include, for example, raw time series data. The time series data may be profiled using an aging profiling engine in block 404, and the profiling may include decomposing/transforming the time series data in block 405 according to the present principles. The decomposing/transforming in block 405 may include extracting an aging term/trend 406, a fluctuation term/trend 408, and determining an error rate 410 according to various embodiments.

In one embodiment, to extract the aging signal/term 406, an aging extraction problem may be formulated as an optimization problem. The extracted aging signal/term 406 may be monotonic and may have a clean separation from background signal and/or noise. Thus, the objective function may be designed to include two parts: (1) minimizing the reconstruction error 410 as a difference between the original time series input in block 402 and sum of the extracted aging trend 406 and the fluctuation term 408, and (2) ensure flatness of the fluctuation term 406 over time according to the present principles.

In one embodiment, the aging trend component 406 may be monotonic (e.g., either non-increasing or non-decreasing) and the fluctuation term component 408 may be flat (e.g., stationary) to ensure that the fluctuation term 408 does not interfere with the aging trend 406. Having this problem statement, the problem may be formulated into an objective function according to the present principles as will be described in further detail herein below with reference to FIG. 5.

In one embodiment, the method for time series decomposition/transformation in block 405 may be performed as follows:

---
Method 1: Decompose Time Series
---

Notations:
    s: intput time series of lenght T
    $x_a$: aging trend (array of length T
    $x_f$: fluctuation term (array of length T)
    $\bar{x}_a$: difference values of aging trend $x_a$
    x: concatenation of aging trend and fluctuation term, $x = x_a + x_f$
    $\bar{x}$: concatenation of $\bar{x}_a$ and $x_f$
    Δ: transform matrix from $\bar{x}_a$ to $x_a$
    ε: small value used as an algorithm stopping criterion
1:    Check the slope of s
2:    if slope is negative then
3:        Δ = Δ⁻
4:    else
5:        Δ = Δ⁺
6:    end if
7:    Compute Q, c
8:    $\bar{x}_a$ = |Q⁻¹ c)|
9:    $f_{old}$ = 0, difference = Infinity
10:   while difference > ε do
11:       Compute $\bar{x}$ by (19)
12:       $f_{new} = \bar{x}^T Q\bar{x} - 2c^T \bar{x}$
13:       difference = abs($f_{old} - f_{new}$)
14:       $f_{new} = f_{old}$
15:   end while
16:   $\bar{x}_a = \bar{x}[1:T]$, $xf = \bar{x}[(T + 1) : 2T]$
17:   $x_a = \Delta \bar{x}_a$
18:   return $x_a$, $x_f$ In one embodiment, the first step of Method 1 in block 405 may be to check the slope of the input time series and determine if Δ⁺ or Δ⁻ should be used. Then, in line 7 of Method 1, Q and c may be computed according to Equation (16) (as illustrated below). In line 8, an initial value of $\bar{x}_a$ may be assigned to be |Q⁻¹c|. After that, the iterative updates may be executed until the difference between objective function values becomes less than ε (e.g., 0.001) according to the present principles. In line 16, we split the $\bar{x}_a$ into its two components (e.g., aging trend difference values and fluctuation term) and recover the aging trend by multiplying Δ by $\bar{x}_a$ in line 17. The method may then return the extracted aging trend and fluctuation term to be used by a controller for detection of aged components and/or management (e.g., controlling) of physical systems according to various embodiments of the present principles.

In one embodiment, with respect to the objective function, the solution may also satisfy two constraints: (1) monotonicity of an aging trend, and (2) non-negativity of the extracted two components 406, 408. The formulated objective function may be analyzed and this problem statement may be further converted/transformed to a Quadratic Programming (QP) formulation whose global optimal solution may be obtained, and may generated scores in block 412. The scores may include an aging score 414 and a confidence score 414. To speed up the problem solving, a matrix transformation technique according to the present principles may be employed to simplify the constraints and reduce the number of constraints from two to one (e.g., only non-negativity constraint). We convert the problem to a Non-negative QP problem that can be solved much more efficiently using iterative updates. We adopt a method to iteratively solve the reformulated Non-negative QP problem and significantly reduce the solving time (and therefore score generation time) in block 412.

In one embodiment, the aging score 414 and confidence score 416 may be employed to analyze the extracted aging component (e.g., physical component of physical system) of the time series. The aging score 414 can be described by the slope of the aging trend 406, while the confidence score 416 depends on the closeness of the slope of the extracted aging trend 406 to the slope of the original time series input in block 402.

In one embodiment, two sigmoid functions may be tuned to quantify the two scores (e.g., aging score 414 and confident score 416). For the aging score 414, the slope of the extracted aging trend 406 may be employed as the input of the sigmoid function, which gives value from, for example, 0 (no aging expressed) to 1 (severe aging). For determination of the confidence score 416, the difference ratio between the slope of the original time series input in block 402 and the slope of the extracted aging trend 406 may be employed according to the present principles. The higher the ratio is, the lower the confidence score may be.

In some embodiments, the two scoring functions 414, 416 can be flexibly tuned according to different application requirements. Based on such scores, the aging profiling engine may employ the result of decomposition/transformation to generate individual component (or multiple component) rankings in block 418. The rankings in block 418 may be determined by combining the two scores 414, 416 to generate a ranking with the fused scores which includes the aging level and the corresponding confidence level of the extraction according to the present principles. System operations may be controlled based on the fused score rankings in block 420, and may include, for example, disabling and/or replacing aging components, rerouting tasks to non-aged components, etc., according to various embodiments.

Figure 5:
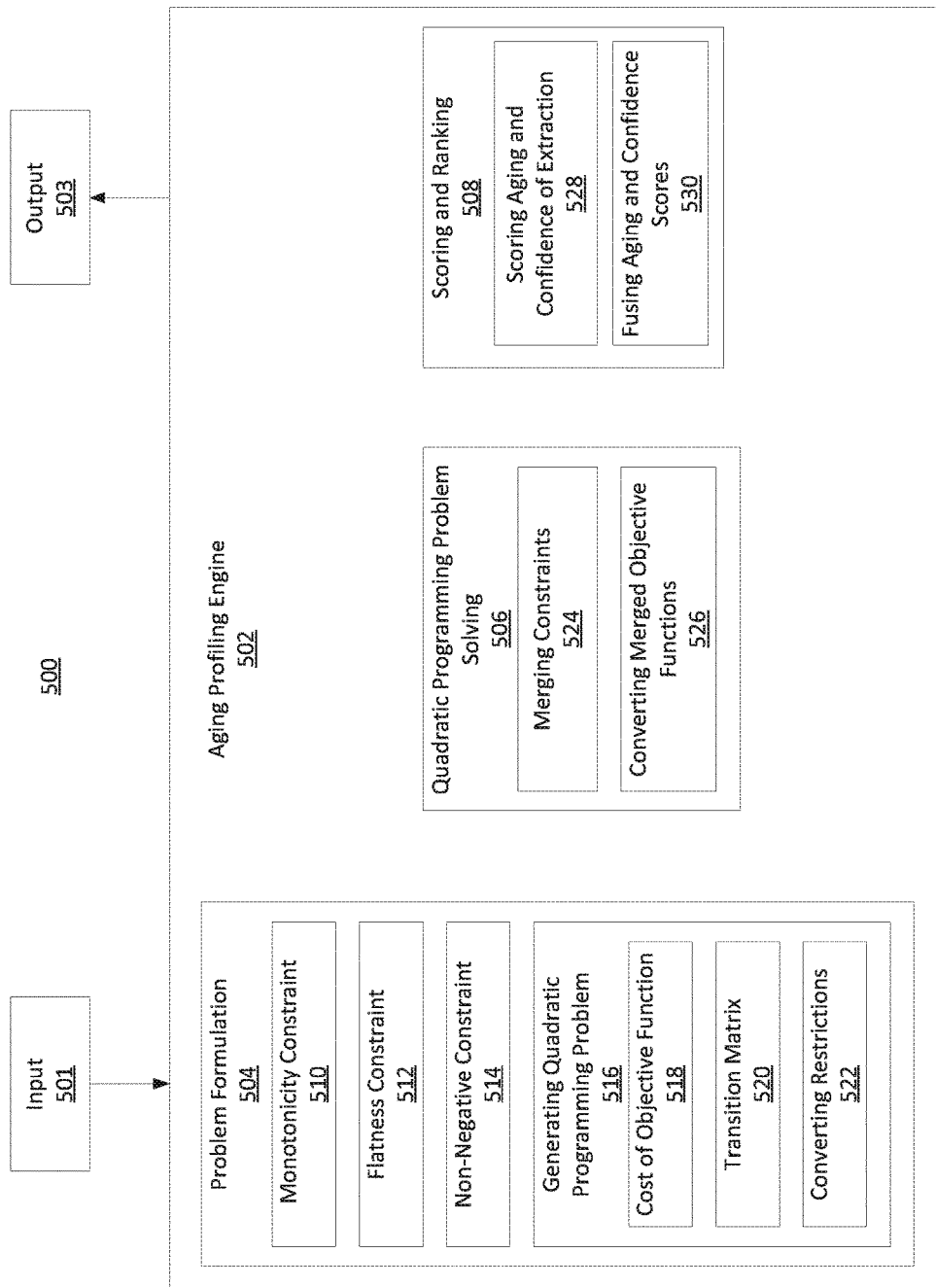
FIG. 5 shows an exemplary method for aging profiling for components of systems using an aging profiling engine, in accordance with an embodiment of the present principles.

Referring now to FIG. 5, with continued reference to FIG. 4, an exemplary method 500 for aging profiling (e.g., for components of physical systems, virtual systems, etc.) using an aging profiling engine is illustratively depicted in accordance with an embodiment of the present principles. In one embodiment, input may be received in block 501, and may include, for example, raw time series data. The data (e.g., time series) input in block 501 may be profiled (e.g., to detect aged system components, detect events that influence currency exchange rates, profile long term stock prices, etc.) using an aging profiling engine in block 502 according to various embodiments of the present principles.

In one embodiment, as described above with reference to FIG. 4, the aging trend component 406 may be monotonic (e.g., either non-increasing or non-decreasing) and the fluctuation term component 408 may be flat (e.g., stationary) to ensure that the fluctuation term 408 does not interfere with the aging trend 406. In one embodiment, having this problem statement as an example, the problem may be formulated into an objective function in block 504 according to the present principles.

In one embodiment, in block 510, a monotonicity constraint to an extracted aging trend (e.g., from raw time series) may be generated according to the present principles, and may reflect the practical aging phenomenon (e.g., component life spans) in one or more physical systems. In block 510, to generate/ensure a monotonic trend xa, the constraint of the objective function may be represented as follows:

$$x_a(t) \leq (\text{or} \geq) x_a(t+1). \qquad (2)$$

In one embodiment, in block 512, a flatness constraint to an extracted operational/noise component may be generated and/or applied according to the present principles, and may ensure clean extraction of aging behavior (e.g., of components of physical systems) out of mixed signals. In one embodiment, to make the fluctuation term stationary and not have a mean change over time, the time series may be segmented, and ensure that the mean value difference of each segment may be as small as possible.

For example, in an illustrative embodiment, given a time series, we may partition it into K segments, each having a mean value, for example, $m_k$, where k=1, 2, ..., K. Then we may minimize the difference between mean values of each pair of the segments in block 512 to ensure flatness of the fluctuation term over time as follows:

$$\min \sum_{i,j=1}^{K} (m_i - m_j)^2 W_{ij} \qquad (3)$$

In this embodiment, W represents a weight matrix, each entry $W_{ij}$ of which specifies the weight we want to put to minimize the mean difference between the segment pair $m_i$ and $m_j$. If W is set to be all 1's, then all the segments have equal weight. Practically, to ensure the long-term mean change is minimized, the present principles may be employed to increase weights when the distance of the segment pair increases (e.g., linear growth of the weight depending on the distance between segments $m_i$ and $m_j$). In this way, the farther the two segments are apart from each other, the more weight is given to minimize their mean difference according to the present principles.

In one embodiment, in block 514, a non-negative constraint may be added to the extracted components according to the present principles, and may reflect the reality of the signals (e.g., received data) from physical systems.

In one embodiment, in block 516, the underlying problem with all constraints may be formed as a Quadratic Programming (QP) problem according to the present principles.

In block 518, a cost of the objective function may be designed/formulated as component reconstruction error and flatness of the operational noise component according to one embodiment of the present principles. The objective function of the optimization problem may be formulated as minimizing the reconstruction error $\|s - x_a - x_f\|^2$ and ensuring flatness of the fluctuation term over time (e.g., Equation (3), and may be subject to the monotonicity constraint from block 510 and the non-negativity constraint from block 514.

In one embodiment, the non-negativity constraint from block 514 means that the extracted aging trend and fluctuation term may have only non-negative values. It may assume that the original time series input in block 501 has only non-negative values as well, but if it is not the case it can be shifted up by summing up the original values with the absolute value of the minimum (negative) value of the time series. Combining this with Equation (2) and Equation (3), the whole objective function may be represented according to the present principles as follows:

$$\min_{s.t.} \|s - x_a - x_f\|^2 + \sum_{i,j=1}^{K} (m_i - m_j)^2 W_{ij} \qquad (4)$$

$$x_a(t) \leq (\text{or} \geq) x_a(t+1), \forall_{t=1,2,\ldots,T-1}$$

$$x_a \geq 0, x_f \geq 0$$

However, Equation (4) cannot be effectively solved in the form presented, and as such, the present principles may be employed to transform it into a Quadratic Problem formulation whose optimal solution may be obtained and/or applied according to various embodiments.

In one embodiment, transition matrices may be designed, and matrix transformations may be performed to convert/represent the constraints/restrictions from block 510 (e.g., monotonicity constraint) into a form according to the QP in block 520. In block 522, the constraints/restrictions from block 512 (e.g., flatness constraint) may be represented using, for example. Laplacian Eigenmap, and the flatness constraint may be converted into a form according to Quadratic Programming according to various embodiments of the present principles.

In block 522. Equation (3) (e.g., the flatness objective) may be transformed and rewritten according to the present principles. In an illustrative embodiment, for each of the segments $m_i$, an indicator vector $e_i$ may be defined and represented as follows:

$$e_i = \left[ \underbrace{0, 0, \ldots, 0}_{1st\ seg}, \underbrace{0, 0, \ldots, 0}_{2nd\ seg}, \ldots, \underbrace{\frac{1}{l}, \frac{1}{l}, \ldots, \frac{1}{l}}_{ith\ seg}, \underbrace{0, 0, \ldots, 0}_{Kth\ seg} \right]^T, \qquad (5)$$

where l is the length of the segment. We let $E=[e_1, e_2, \ldots e_K]^T$, and then the flatness objective from Equation (3) may be represented as follows:

$$\min x_f^T(E^T L E)x_f \qquad (6)$$

where L=D−W and D=diag(W*1) to generate a transformed representation of the flatness objective from Equation (3) according to the present principles.

In one embodiment, after the transformation of the flatness objectives (e.g., constraints/restrictions) in block 522, the original form of the flatness objective in Equation (4) may be replaced with its new, transformed form from Equation (6) to generate the following equation formulation:

$$\min_{s.t.} \|s - x_a - x_f\|^2 + \lambda \cdot x_f^T(E^T L E)x_f \qquad (7)$$

$$x_a(t) \leq x_a(t+1), \forall_{t=1,2,\ldots,T-1}$$

$$x_a \geq 0, x_f \geq 0.$$

In block 520, Equation (2) (e.g., the monotonicity constraint) may be transformed and rewritten according to the present principles. In an illustrative embodiment, we may define $x=[x_a^T, x_f^T]^T$, $E_2=[I, I]$, $E_1=[0, I]$, where I is a T×T identity matrix (e.g., transition/transformation matrix) in block. In some embodiments, matrices B and C may be defined according to the present principles as follows:

$$B = \begin{bmatrix} 1 & -1 & & & \\ & 1 & -1 & & \\ & & & \ldots & \\ & & & 1 & -1 \end{bmatrix}, C = [B, 0_{T-1 \times T-1}].$$

In one embodiment, under the definitions as described above, the monotonicity constraint may be represented as follows:

$$C_x \geq 0, \quad (8)$$

and the non-negative constraints may be represented as follows:

$$x \geq 0. \quad (9)$$

The form of the objective function in Equation (7) may be further transformed in block 516 to generate the following equation formulation:

$$\min_{s.t.} x^T (E_2^T E_2 + \lambda E_1^T E^T LEE_1) x - 2(E_2^T s)^T x \quad (10)$$

$$Cx \geq 0$$

$$x \geq 0$$

As is evident from the above, Equation (10) is in the form of a Quadratic Programming (QP) optimization problem, and an efficient optimization method to solve this problem will be described in detail herein below according to various embodiments of the present principles.

As described above with respect to FIGS. 4 and 5, in one embodiment, a given time series may be decomposed (e.g., transformed) to an aging part (trend) and fluctuation part. During the decomposition, the reconstruction error may be introduced, and thus, the confidence of such decomposition may depend on the value of the error. In block 508, scoring and/or ranking may be employed for assessing the severeness of the aging as well as the confidence level that the present principles may provide. Essentially, the aging score can be described by the slope of an aging trend, while the confidence score may depend on the closeness of the slope of the extracted aging trend to the slope of the original time series.

In block 528, two sigmoid functions may be employed to quantify the two scores. In one embodiment, the two sigmoid functions for scoring the aging behavior and the confidence of the extraction may be determined and/or applied according to the present principles. For example, with respect to the aging score, the slope of the extracted aging trend may be employed as the input of the sigmoid function, which gives value from, for example, 0 (no aging expressed) to 1 (severe aging). For the confidence score, we use the difference ratio between the slope of the original time series and the slope of the extracted aging trend (e.g., (ori. slope−ext. slope)/ori. slope, as the input. The higher the ratio is, the lower the confidence score will be.

In some embodiments, the two scoring functions can be flexibly tuned according to different application requirements. For example, the aging score may be pre-tuned to give 0 for zero-slope aging trend, while giving 1 when the slope is close to 0.015 in an illustrative embodiment. In one embodiment, the confidence score function can be tuned such that it scores 1 when the ratio is 0 while scoring 0 when the ratio is close to 1. In block 530, the two scores may be fused to provide a ranking for the extracted aging phenomenon according to the present principles.

In block 504, an underlying aging profiling problem may be transformed into a QP problem according to one embodiment of the present principles. However, general (e.g., conventional) QP solvers that may be employed for a wide range of purposes are slow at processing, especially for large time series (e.g., more than one thousand data points). Essentially, finding a solution for a time series of one thousand data points is equivalent to solving a system of equations with one thousand variables, which is extremely costly in terms of computation costs, and thus is not scalable.

In block 506, the computational cost may be reduced, and any size time series may be employed efficiently according to various embodiments of the present principles. A goal in block 506 is to further transform (e.g., rewrite) the QP formulation in Equation (10) to eliminate the monotonicity constraint and only keep the non-negative constraint to make the problem solving much easier (e.g., more computationally efficient, faster processing, etc.). In one embodiment, it may be observed that the monotonicity constraint expresses the fact that the difference between two neighboring element may be non-negative.

In block 524, a transition matrix may be employed to merge a representation of the monotonicity constraint from block 510 and a non-negative constraint from, for example, 512 or 514, into one form according to the present principles. In one embodiment, based on the above observation, a transition variable $\bar{x}_a$ may be introduced, and the problem statement may be changed in the following way: instead of using $x_a$ as a part of the variables, we may use the following surrogate $\bar{x}_a$ as the variable, which satisfies the equality:

$$x_a(1) = \bar{x}_a(1)$$

$$x_a(2) = \bar{x}_a(1) + \bar{x}_a(2)$$

$$\ldots$$

$$x_a(k) = \bar{x}_a(1) + \bar{x}_a(2) + \ldots + \bar{x}_a(k).$$

In other words, the first element in $\bar{x}_a$ in the above example may be equal to the first element of $x_a$, and the remaining elements in $\bar{x}_a$ may represent the difference between two neighboring between two neighboring elements of $x_a$. In one embodiment, In one embodiment, the relationship between trend $x_a$ and difference values $\bar{x}_a$ may be represented as follows:

$$x_a = \Delta \bar{x}_a \quad (11)$$

where $\Delta = \Delta^-$ if the trend is non-increasing, and $\Delta = \Delta^+$ if the trend is non-decreasing, which may be represented as follows:

$$\Delta^- = \begin{bmatrix} 1 & & & & \\ 1 & 1 & & & \\ 1 & 1 & 1 & & \\ \ldots & & & & \\ 1 & 1 & 1 & \ldots & 1 \end{bmatrix} \quad (12)$$

$$\Delta^+ = \begin{bmatrix} 1 & & & & \\ 1 & -1 & & & \\ 1 & -1 & -1 & & \\ \ldots & & & & \\ 1 & -1 & -1 & \ldots & -1 \end{bmatrix} \quad (13)$$

In one embodiment, we may let $[\bar{x}_a^T \; x_f^T]^T$. In block 524, by using this transform, we may merge the monotonicity constraint $Cx \geq 0$ in Equation (8) and the non-negative constraint $x \geq 0$ in Equation (9) into one constraint, which may be represented as follows:

$$\bar{x} \geq 0. \quad (14)$$

In one embodiment, in block 526, the merged objective functions may be converted to a form that may be solved iteratively and highly efficiently according to the present principles. We may let $\overline{E}_2=[\Delta 1]$, and the original QP problem from Equation (10) may be transformed and represented with only one constraint as follows:

$$\min_{s.t.} \overline{x}^T (\overline{E}_2^T \overline{E}_2 + \lambda E_1^T E^T LEE_1) \overline{x} - 2(\overline{E}_2^T s)^T \overline{x} \qquad (15)$$

$$\overline{x} \geq 0.$$

We may further define:

$$Q = (\overline{E}_2^T \overline{E}_2 + \lambda E_1^T E^T LEE_1) \qquad (16)$$

$$c = \overline{E}_2^T s,$$

and then the transformed problem may be represented as a simple non-negative QP problem as follows:

$$\min_{s.t.} \overline{x}^T Q \overline{x} - 2c^T \overline{x} \qquad (17)$$

$$\overline{x} \geq 0$$

It is noted that Equation (10) is equivalent to Equation (17). After solving Equation (17), the obtained aging trend $x_a$ may be simply recovered with $\overline{x}_a$, as shown in Equation (11). In some embodiments, in block 526, the merged objective functions may be further transformed to be more efficiently solved, as employing a non-negative QP problem according to the present principles may be solved much more efficiently than a general QP problem, and the results may be output in block 503 in accordance with the present principles.

In one embodiment, an advantage of solving the Quadratic Programming problem using a non-negative QP formulation in block 506 is that it makes the structure simpler, as non-negativity constraints are much easier to handle (e.g., process) than linear inequality constraints. Typically, they lead to closed-form iterations that may be computed very efficiently according to the present principles. For example, multiplicative updates may be employed to obtain the solution efficiently according to various embodiments. Let $Q^+$ and $Q^-$ be defined as follows:

$$Q_{ij}^+ = \begin{cases} Q_{ij} & Q_{ij} \geq 0 \\ 0 & \text{otherwise} \end{cases} \quad Q_{ij}^- = \begin{cases} |Q_{ij}| & Q_{ij} < 0 \\ 0 & \text{otherwise} \end{cases} \qquad (18)$$

Then, the update/transformation may be represented as follows:

$$\overline{x}_{i+1} \leftarrow \overline{x}_i \left[ \frac{-c_i + \sqrt{c_i^2 + 4(Q^+ \overline{x})_i (Q^- \overline{x})i}}{(2Q^+ \overline{x})_i} \right], \qquad (19)$$

where $x_i$ is a vector x obtained after i iterations according to the present principles.

In one embodiment, a good initialization can improve convergence, and one may use, for example, $|Q^{-1}c|$ as a start solution according to the present principles. In one embodiment, a good initialization value can reduce the number of steps for the algorithm to find the optimal solution. That is, a good initialization value may be a point whose distance to the optimal point is short (e.g., shorter than a randomly selected point). Due to this, the effort (e.g., computational intensity) used for finding the optimal point with good initiation point may be less than the one with a randomly selected initialization point according to the present principles.

To compute $Q^{-1}$, low-rank approximation techniques, including, for example, linear complexity may be employed. In one embodiment, this avoids using general QP-solvers that are typically designed for general purpose formulations with both linear and non-linear constraints, and thus makes the solving process in block 506 according to the present principles much more efficient than when using conventional systems and methods for solving.

Referring now to FIG. 6, an exemplary system for aging profiling for physical systems using an aging profiling engine is illustratively depicted in accordance with an embodiment of the present principles.

While many aspects of system 600 are described in singular form for the sakes of illustration and clarity, the same can be applied to multiples ones of the items mentioned with respect to the description of system 600. For example, while a single controller 680 is illustratively depicted, more than one controller 680 may be used in accordance with the teachings of the present principles, while maintaining the spirit of the present principles. Moreover, it is appreciated that the controller 680 is but one aspect involved with system 600 than can be extended to plural form while maintaining the spirit of the present principles.

The system 600 may include a bus 601, a data collector 610, an aging profiler 620, an aging trend generator 622, a fluctuation term generator 624, an error detector/generator 626, an optimizer/QP problem solver 630, an aging score generator 640, a confidence score generator, a ranker 660, a storage device 670, and/or a controller 680 according to various embodiments of the present principles.

In one embodiment, the data collector 610 may be employed to collect raw data (e.g., component aging data, time series, system operational status, etc.), and the raw data may be received as input to an aging profiler/time series transformer 620 (e.g., aging profiling engine). The aging profiler 620 may decompose (e.g., transform) raw time series into an aging trend, a fluctuation term and/or errors using an aging trend generator 622, a fluctuation term generator 624, and/or an error detector/generator 626, respectively, according to various embodiments. The decomposed/transformed data (e.g., raw time series) may be stored in a storage device 670 for later access (e.g., during processing, problem solving, etc.) according to the present principles.

In block 630, an optimizer/QP problem solver may be employed to merge representations of monotonicity constraints and non-negative constraints into one form. The merged objective functions may be converted into a form that may be solved iteratively and efficiently using, for example, Quadratic Programming problem solving according to various embodiments of the present principles. An aging score may be generated using an aging score generator 640, and the aging score may be described as a slope of the aging trend in a given time series. A confidence score generator 650 may be employed to determine a confidence score, and the confidence score may depend on the closeness of the slope of the extracted aging trend to the slope of the original time series. In one embodiment, the confidence score generator 650 may employ a fluctuation term and reconstruction error data to generate the confidence score according to the present principles.

Based on such scores, a ranker 660 may employ the result of decomposition/transformation to generate individual component (or multiple component) rankings. The rankings may be determined by combining the two scores from the score generators 640 and 650 to generate a ranking with the fused scores which includes the aging level and the corresponding confidence level of the extraction according to the present principles. System operations may be controlled based on the fused score rankings using a controller 680, and may include, for example, disabling and/or replacing aging components, rerouting tasks to non-aged components, etc., according to various embodiments of the present principles.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention.

Those skilled in the art could implement various other feature combinations without departing from the scope and spirit of the invention.

What is claimed is:

1. A method for managing components of physical systems, comprising:
    decomposing raw time series by extracting an aging trend and a fluctuation term from the time series using an objective function of an optimization problem, the objective function minimizing reconstruction error and ensuring flatness of the fluctuation term over time;
    transforming the optimization problem into a Quadratic Programming (QP) formulation including a monotonicity constraint and a non-negativity constraint, the transforming reducing processing requirements and increasing optimization speed by merging the constraints together prior to solving the optimization problem;
    generating an aging score and a confidence score for the extracted aging trend to determine a severeness of aging for one or more components of the physical system;
    fusing the aging score and confidence score to provide a fused ranking for the extracted aging trend for predicting future failures of the components, and
    preventing failure of the physical systems by disabling lower ranked, aged components and rerouting tasks to higher-ranked, less-aged components based on the fused ranking.

2. The method as recited in claim 1, wherein the constraints are merged using a transition matrix.

3. The method as recited in claim 1, wherein the aging score is the slope of the aging trend.

4. The method as recited in claim 1, wherein the confidence score is based on the closeness of a slope of the extracted aging trend to a slope of the raw time series.

5. The method as recited in claim 1, wherein the aging score and confidence score are flexibly tuned using sigmoid functions according to particular application requirements.

6. The method as recited in claim 1, wherein the aging trend is a monotonic sequence representing a change of a mean value of the time series over a particular time period, and the fluctuation term is a stationary component in which a mean value is constant over a particular time period.

7. The method as recited in claim 1, wherein the Quadratic Programming (QP) formulation is transformed into a non-negative QP problem and solved using iterative updates.

8. The method as recited in claim 1, wherein a precise location of a starting point of component degradation is determined based on the ranking.

9. An aging profiling engine for managing components of physical systems, comprising:
    a time series transformer for decomposing raw time series by extracting an aging trend and a fluctuation term from the time series using an objective function of an optimization problem, the objective function minimizing reconstruction error and ensuring flatness of the fluctuation term over time;
    an optimizer for transforming the optimization problem into a Quadratic Programming (QP) formulation including a monotonicity constraint and a non-negativity constraint, the transforming reducing processing requirements and increasing optimization speed by merging the constraints together prior to solving the optimization problem;

one or more score generators for generating an aging score and a confidence score for the extracted aging trend to determine a severeness of aging for one or more components of the physical system;

a ranker configured to fuse the aging score and confidence score to provide a fused ranking for the extracted aging trend for predicting future failures of the components, and a controller for preventing failure of the physical systems by disabling lower ranked, aged components and rerouting tasks to higher-ranked, less-aged components based on the fused ranking.

10. The aging profiling engine as recited in claim 9, wherein the constraints are merged using a transition matrix.

11. The aging profiling engine as recited in claim 9, wherein the aging score is the slope of the aging trend.

12. The aging profiling engine as recited in claim 9, wherein the confidence score is based on the closeness of a slope of the extracted aging trend to a slope of the raw time series.

13. The aging profiling engine as recited in claim 9, wherein the aging score and confidence score are flexibly tuned using sigmoid functions according to particular application requirements.

14. The aging profiling engine as recited in claim 9, wherein the aging trend is a monotonic sequence representing a change of a mean value of the time series over a particular time period, and the fluctuation term is a stationary component in which a mean value is constant over a particular time period.

15. The aging profiling engine as recited in claim 9, wherein the Quadratic Programming (QP) formulation is transformed into a non-negative QP problem and solved using iterative updates.

16. The aging profiling engine as recited in claim 9, wherein a precise location of a starting point of component degradation is determined based on the ranking.

* * * * *